US012560691B2

(12) United States Patent
Rakuljic et al.

(10) Patent No.: US 12,560,691 B2
(45) Date of Patent: Feb. 24, 2026

(54) PHOTONIC INTEGRATED CIRCUIT, LIGHT DETECTION AND RANGING SYSTEM AND VEHICLE HAVING THE SAME

(71) Applicant: Intel Corporation, Santa Clara, CA (US)

(72) Inventors: George Rakuljic, Santa Monica, CA (US); Naresh Satyan, Pasadena, CA (US); Ron Friedman, Givat Oz (IL); Israel Petronius, Haifa (IL); Yaakov Vilenchik, Menlo Park, CA (US); Christopher T. Cotton, Honeoye Falls, NY (US)

(73) Assignee: Intel Corporation, Santa Clara, CA (US)

( * ) Notice: Subject to any disclaimer, the term of this patent is extended or adjusted under 35 U.S.C. 154(b) by 1001 days.

(21) Appl. No.: 17/687,704

(22) Filed: Mar. 7, 2022

(65) Prior Publication Data

US 2022/0381888 A1     Dec. 1, 2022

Related U.S. Application Data

(63) Continuation of application No. PCT/US2021/034670, filed on May 28, 2021.

(51) Int. Cl.
| | |
|---|---|
| *G01S 7/499* | (2006.01) |
| *G01S 7/481* | (2006.01) |
| *G01S 17/931* | (2020.01) |

(52) U.S. Cl.
CPC ............ *G01S 7/499* (2013.01); *G01S 7/4817* (2013.01); *G01S 7/4818* (2013.01); *G01S 17/931* (2020.01)

(58) Field of Classification Search
CPC ...... G01S 7/499; G01S 7/4817; G01S 7/4818; G01S 17/931; G01S 7/4812; G01S 7/4917
See application file for complete search history.

(56) References Cited

U.S. PATENT DOCUMENTS

| | | | | |
|---|---|---|---|---|
| 11,061,140 B2 * | 7/2021 | Hosseini | ............... | G01S 7/4813 |
| 11,940,571 B2 * | 3/2024 | Oza | ......................... | G01S 17/34 |

(Continued)

FOREIGN PATENT DOCUMENTS

| | | | | |
|---|---|---|---|---|
| CN | 112764008 A | 5/2021 | | |
| WO | WO-2010098171 A1 * | 9/2010 | ............. | G02B 6/122 |

OTHER PUBLICATIONS

CN 112764008 A translation (Year: 2021).*

(Continued)

*Primary Examiner* — Yuqing Xiao
*Assistant Examiner* — Jempson Noel
(74) *Attorney, Agent, or Firm* — Viering, Jentschura & Partner mbB

(57) ABSTRACT

A photonic integrated circuit is provided having a plurality of light paths each configured to branch light received from at least one light receiving input to a first light path section and a second light path section, to turn the polarization of at least a portion of the light received at the receiving input into light of a first linear polarization and light of a second linear polarization that is orthogonal to the first polarization; wherein the first light path section is configured to emit light of the first linear polarization to the outside; wherein the second light path section is configured to determine an interference signal using the light having the second linear polarization of the first light path and light having the second received from the outside.

23 Claims, 6 Drawing Sheets

(56)     References Cited

U.S. PATENT DOCUMENTS

| | | | |
|---|---|---|---|
| 2008/0137058 A1 | 6/2008 | Cesare | |
| 2011/0188054 A1* | 8/2011 | Petronius | G02B 26/10 |
| | | | 356/610 |
| 2018/0100924 A1 | 4/2018 | Brinkmeyer | |
| 2018/0139007 A1 | 5/2018 | Kamei et al. | |
| 2019/0018120 A1* | 1/2019 | Efimov | G01S 7/4911 |
| 2019/0101647 A1 | 4/2019 | Feshali | |
| 2020/0003879 A1 | 1/2020 | Amor et al. | |
| 2020/0088848 A1* | 3/2020 | Kremer | G01S 17/66 |
| 2020/0333533 A1 | 10/2020 | Rogers et al. | |
| 2020/0400798 A1* | 12/2020 | Rezk | G01S 7/4817 |
| 2022/0075044 A1* | 3/2022 | Michaels | G01S 7/4917 |
| 2022/0350028 A1* | 11/2022 | Tows | G01S 7/497 |

OTHER PUBLICATIONS

WO 2010098171 A1 English (Year: 2010).*
International Search Report issued for the corresponding international patent application No. PCT/US2021/034670, dated Feb. 25, 2022, 3 pages (for informational purposes only).
Extended European search report issued for the corresponding European patent application No. 21943265.5, dated Dec. 19, 2024, 9 pages (for informational purposes only).

* cited by examiner

FIG.5
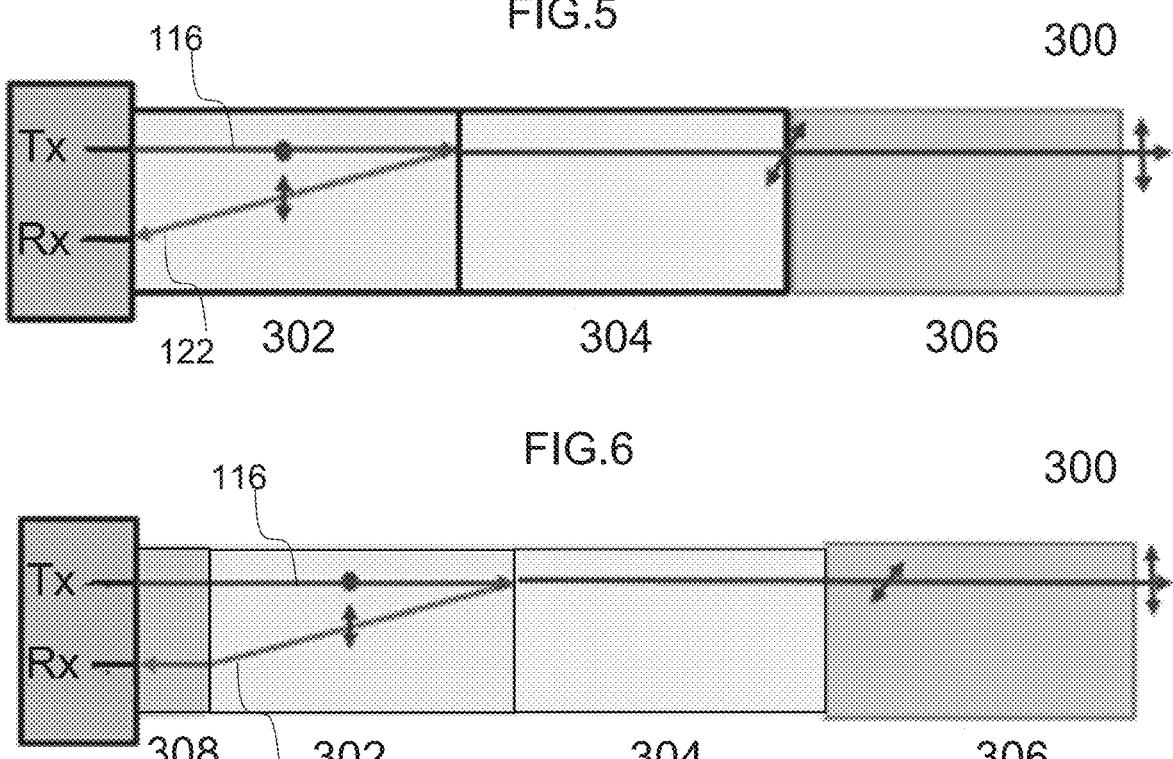
FIG.6
FIG.7
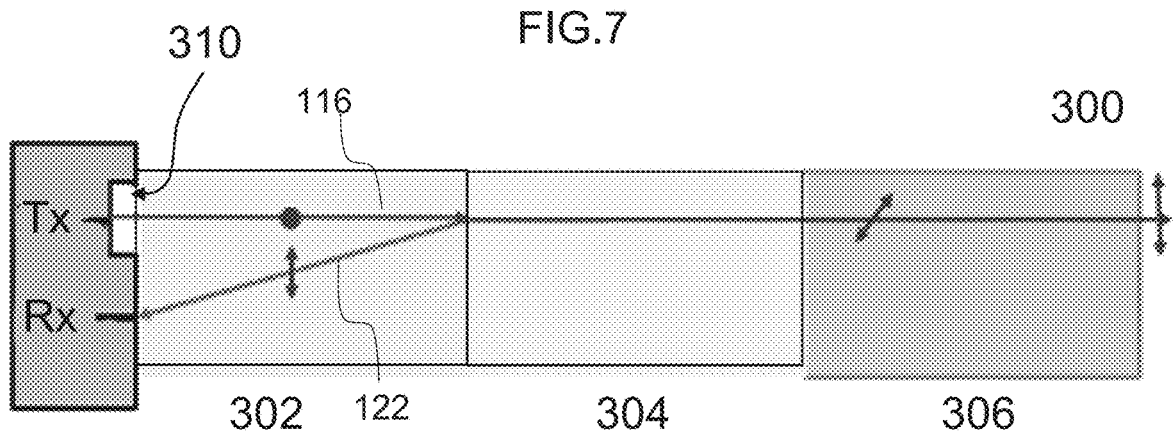

PHOTONIC INTEGRATED CIRCUIT, LIGHT DETECTION AND RANGING SYSTEM AND VEHICLE HAVING THE SAME

CROSS-REFERENCE TO RELATED APPLICATION

This non-provisional application is a domestic bypass continuation application of PCT/US2021/034670, filed on May 28, 2021, the entirety of which is fully incorporated herein by reference.

TECHNICAL FIELD

This disclosure generally relates to the field of light detection and ranging systems.

BACKGROUND

Coherent light detection and ranging (LIDAR) is desirable for autonomous vehicles due to its inherent immunity to optical interference and ability to detect both the range and range-rate (relative velocity of a target) to a target. Notwithstanding these attributes, a coherent LIDAR system must still provide a long range detection capability (>200 m) and a high data rate (>1M pixels/s) with high optical resolution (>100 vertical pixels) to be commercially viable. Unfortunately, the performance of a coherent LIDAR is negatively affected by time-of-flight (TOF) limitations on the detection process and fluctuating (Swerling II) target effects due to speckle.

The TOF limitation restricts the data rate of a coherent LIDAR system imposed by the finite speed of light and the need for multiple chirps to resolve Doppler ambiguity. For example, for a maximum range of 300 m, the data rate of a single optical channel (laser beam) is limited to 0.25 M pixels/s. Due to speckle, targets appear to fluctuate in a coherent LIDAR system, and the signal-to-noise-ratio (SNR) required for high probability detection can be more than 10 dB greater than for non-fluctuating targets. Without mitigation, a 10 dB SNR penalty would reduce the range of detection of a coherent LIDAR by a factor of three compared to an incoherent system.

The key to speckle mitigation, and to regaining the range performance in a coherent LIDAR, is to obtain multiple measurements over each scene pixel during each scan of the field of view, and then incoherently integrate them to mitigate the target fluctuations. The drawback is a further reduction in data rate by a factor of two or more, depending on the number of measurements to be integrated.

A Photonic Integrated Circuit (PIC) is desirable for coherent LIDAR due to the promise of low cost and scalability to high volume. However, due to PIC limitations (size, yield, cost), the number of vertical channels (resolution elements) is limited (~10's) and does not easily scale. Further, most of the targets of LIDAR do not maintain the circular polarization state of the emitted light when it is reflected, thus reducing the collected signal.

Usually, a bistatic coherent LIDAR with separate transmitter/receiver (Tx/Rx) PICs is used. In the bistatic coherent LIDAR, a quarter wave plate (QWP) may be used to produce circularly polarized light of either right-hand-circular (RHP) or left-hand-circular-polarization (LHP) at the target. If the target maintains the polarization on reflection, the handedness will change. By changing the handedness of the circular polarization (RHP to LHP or LHP to RHP) as the PIC is able to differentiate between received (RX) signals and transmitted (Tx) signals. However, the bistatic coherent LIDAR with separate transmitter/receiver (Tx/Rx) PICs is bigger, has more components, and is more difficult to align and assemble into a reliable package than a single PIC for Tx and Rx.

Alternatively, a monostatic coherent LIDAR with a single transmitter/receiver (Tx/Rx) PIC may be provided. A monostatic coherent LIDAR with a single transmitter/receiver (Tx/Rx) PIC is usually subject to greater interference and lower isolation of the (common) transmit and receive channels, thus reducing LIDAR performance.

Solutions based on separate Rx or Tx optics and/or optical paths, where the RX stares at the target with different viewing-angles, offsets, focii, or fields of view (FOV) compared to the Tx beam may be provided. These solutions are inferior in efficiency and range due to mismatch between the Tx and Rx modes, which is crucial in a coherent receiver.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 5 to FIG. 8B illustrate schematic diagrams of polarization diversity optics of a LIDAR system.

DESCRIPTION

The following detailed description refers to the accompanying drawings that show, by way of illustration, specific details and aspects in which the invention may be practiced.

The term "as an example" is used herein to mean "serving as an example, instance, or illustration". Any aspect or design described herein as "as an example" is not necessarily to be construed as preferred or advantageous over other aspects or designs.

Illustratively, a single Photonic Integrated Circuit (PIC) implementation of a coherent bistatic light detection and ranging (LIDAR) system including polarization diversity optics in the optical path between the PIC and a lens is provided. In general, Rx channels and Tx channels of a LIDAR system share the same optical path but with opposite directions of propagation. The polarization diversity optics alters the independent polarization state of the receive (Rx) channels and transmit (Tx) channels of the light paths of the LIDAR between the PIC and the lens. Also, the polarization diversity optics may introduce beam wave front errors (also denoted as aberrations) for a diverging beam, e.g. the light paths between the PIC and the lens. The aberrations may reduce the signal collection efficiency and degrade the transmitted and received beam optical quality making it more difficult to distinguish between the Rx channels and Tx channels. Thus, a suitably designed polarization diversity optic that minimizes aberrations may provide an improved isolation of the (separate) Tx and Rx channels. This way, a high optical resolution, a high data rate, and a long-range detection may be provided. In other words, a single Tx/Rx PIC with separate transmit channels and receive channels is combined with polarization diversity optics to enable a bistatic coherent LIDAR. In this manner, a (bistatic) coherent LIDAR with high optical resolution, high data rate, and long-range detection can be achieved with fewer parts and easier alignment and assembly.

Figure 1:
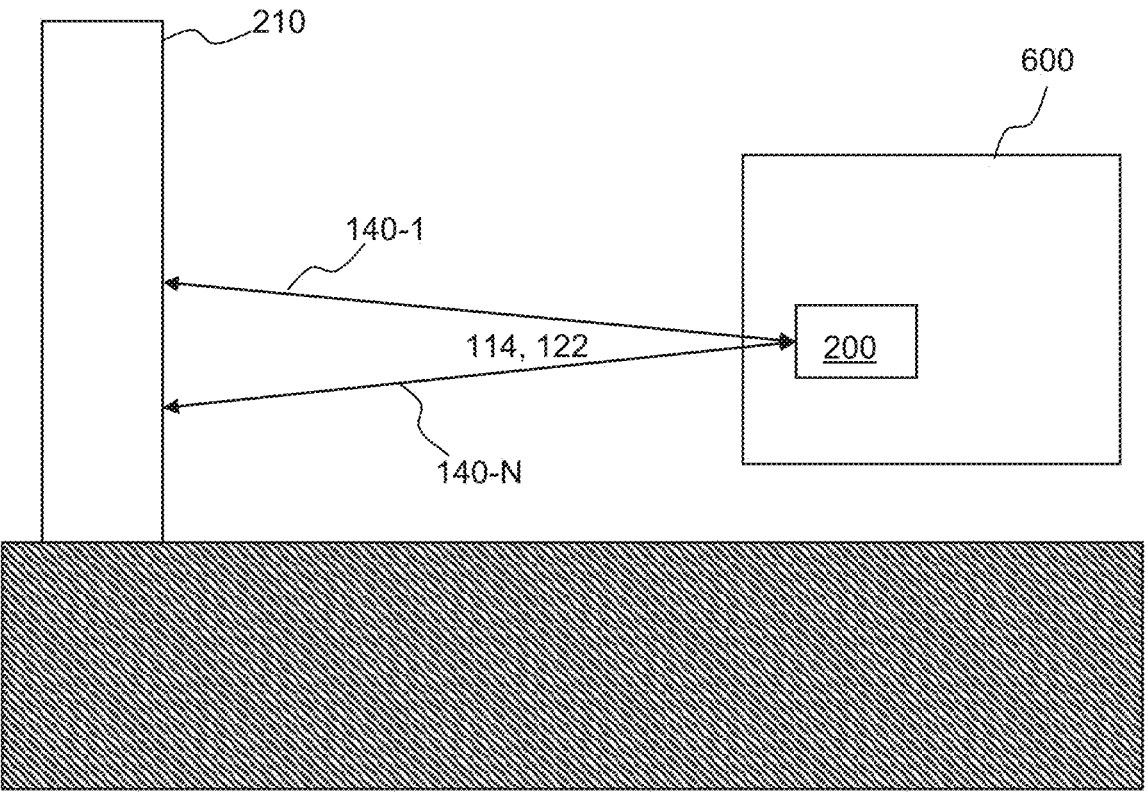
FIG. 1 illustrates a schematic diagram of a vehicle having a LIDAR.

FIG. 1 illustrates a schematic diagram of a vehicle 600 having a LIDAR system 200 integrated therein, as an example. The vehicle 600 may be an unmanned vehicle, e.g. unmanned aerial vehicle or unmanned automobile. The vehicle 600 may be an autonomous vehicle. Here, the LIDAR system 200 may be used to control the direction of travel of the vehicle 600. The LIDAR system 200 may be configured for obstacle detection outside of the vehicle 600, as an example. Alternatively or in addition, the vehicle 600 may require a driver to control the direction of travel of the vehicle 600. The LIDAR system 200 may be a driving assistant. As an example, the LIDAR system 200 may be configured for obstacle detection, e.g. determining a distance and/or direction and relative velocity of an obstacle (target 210) outside of the vehicle 600. The LIDAR system 200 may be configured, along one or more light paths 140-*i* (with i being an integer between 1 and N), to emit light 114 from one or more outputs Tx of the LIDAR system 200 and to receive light 122 reflected from the target 210 in one or more light inputs Rx of the LIDAR system 200 (see also FIG. 3 and FIG. 4). Alternatively, the LIDAR system 200 may be or may be part of a spectrometer or microscope.

Figure 2:
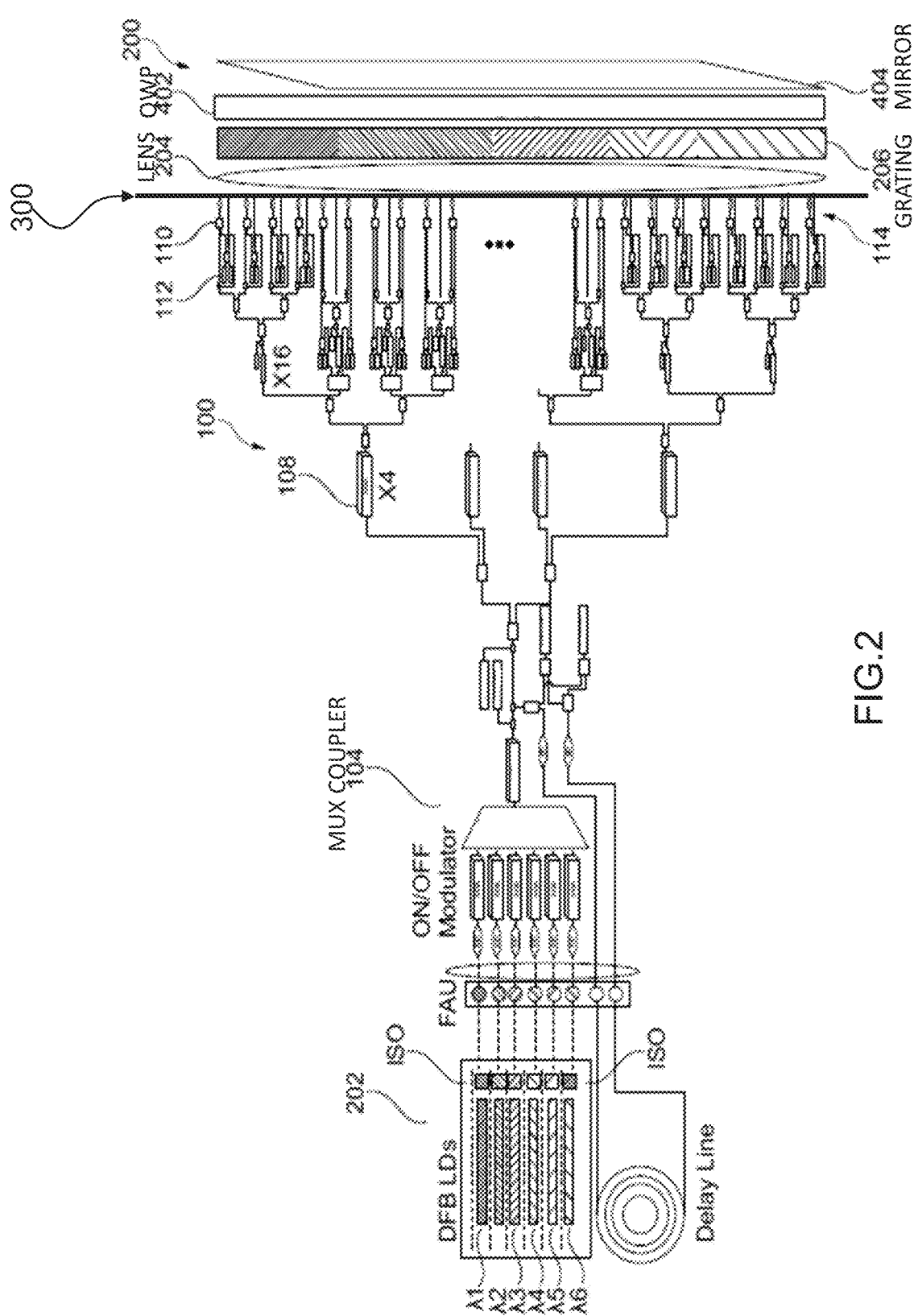
FIG. 2 illustrates a schematic diagram of a LIDAR.

FIG. 2 illustrates a schematic diagram of a bistatic LIDAR system 200. The LIDAR system 200 includes a photonic integrated circuit (PIC) 100. The LIDAR system 200 may further include a scan mirror 404 in the light path between a grating structure 206 and the outside of the LIDAR system 200. The LIDAR system 200 may further include a quarter wave plate (QWP) 402 in the light path between the grating structure 206 and the scan mirror 404 and/or the outside of the LIDAR system 200.

A lens 204 may be arranged between the PIC 100 and the grating structure 206, and the polarization diversity optics 300 is arranged between the PIC 100 and the lens 204.

The polarization diversity optics 300 are described in more detail below, see e.g. FIG. 5 to FIG. 8B.

The grating structure 206 may be a transmission grating, a reflective grating, or a grism.

The lens 204 may be any one of a converging lens 204, a collimating lens 204 or a diverging lens.

The grating structure 206 may be optically arranged to guide light from the output Tx of the PIC 100 to the outside of the LIDAR system 200 and from the outside of the LIDAR system 200 to the plurality of optical photo detector structures 112.

Using a multiple (M) wavelength laser source 202 and the grating structure 206, the number of LIDAR channels may be increased by a factor of M for a given PIC 100 to achieve a desired high number (>100) of vertical resolution elements or pixels. Hence, a high-performance coherent LIDAR system 200 is achieved.

Figure 4:
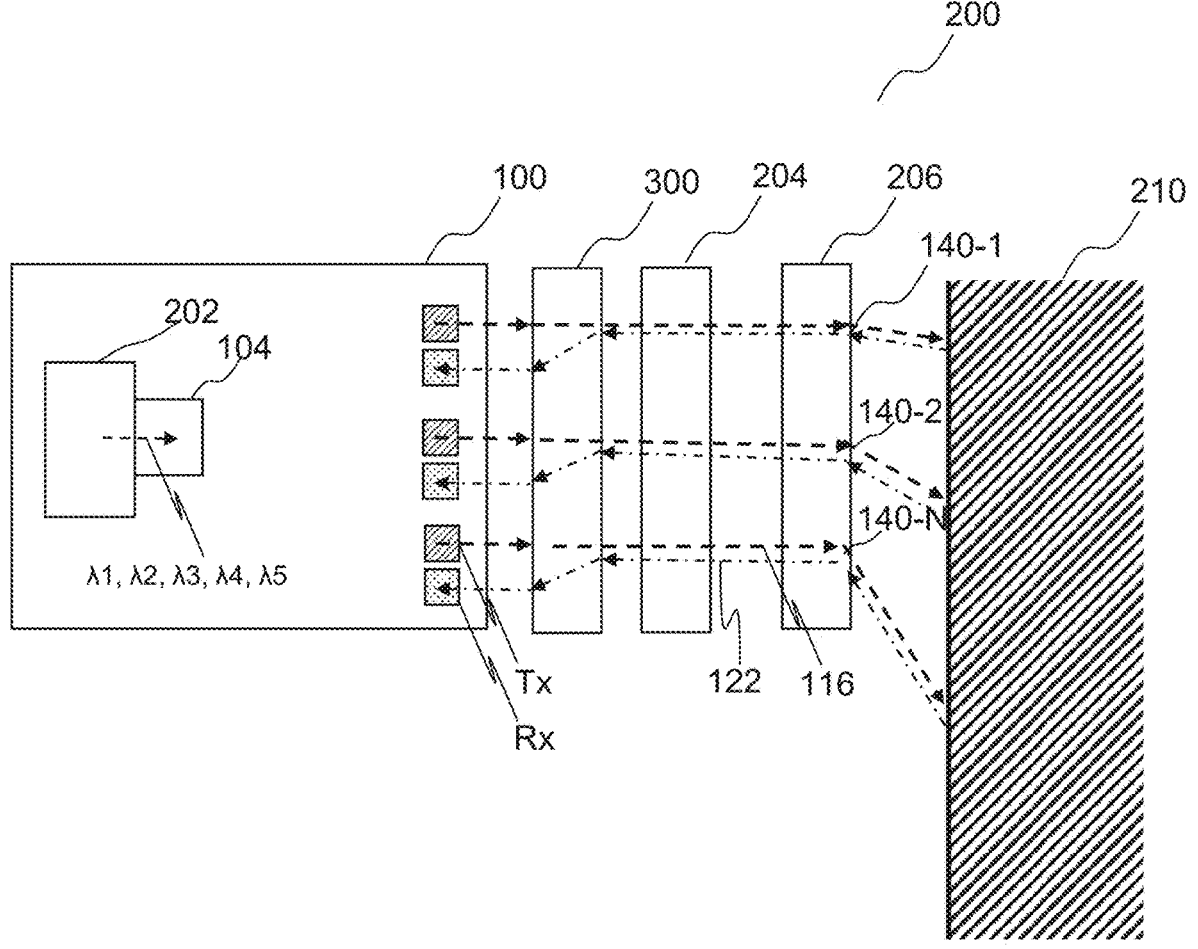
FIG. 4 illustrates a schematic diagram of a LIDAR system.

The one or more outputs Tx may emit electromagnetic radiation, e.g. ultra-violet light, visible light, infrared radiation, terahertz radiation or microwave radiation (denoted as "light" throughout this specification) to different parts of a target 210, e.g. at the same time or subsequently, e.g. by the grating structure 206 and/or the lens structure 204 along one or more light paths 140-N, as illustrated in FIG. 4. This way, light emitted by the output Tx of the PIC 100 samples different portions of a target (not the same pixel) 210 and/or different targets 210 at the same time. Thus, light reflected

122 from the target 210 and detected by the photo detector structures 122 of different light paths contains information correlated to different portions of a target (not the same pixel) and/or different targets at the same time. In other words, a plurality of light paths 140-N emit light into different directions in space using the grating 206. The target 210 reflects back light 122 and receives light 122 in the same light path until after the lens 204 and then, polarization diversity optics 300 transmits light 122 along a different path to Rx. This way, a mapping between the emitted light and the information of the target 210 may be enabled. As an example, a sampling rate of the LIDAR system 200 and, thus, a resolution, may be increased while at least maintaining or decreasing noise effects.

The photonic integrated circuit 100 may include a plurality of light paths 140-N. Thus, as an example, multiple (>10) vertical optical channels operating in parallel may be provided. Hence, a high (>1M pixels/s) overall or effective data rate may be enabled. The number of PIC channels to increase the number of vertical resolution elements (or reduce the cost by using fewer or smaller PICs) is readily scalable. The coherent LIDAR implemented on a silicon PIC will (uniquely) enable the high performance and reduced pricing required by customers for autonomous vehicle applications.

As further illustrated in FIG. 2, the LIDAR system 200 may include a plurality of light sources (also denoted as (coherent) electromagnetic radiation source) 202 each configured to emit electromagnetic radiation having a wavelength $\lambda_1$, $\lambda_2$, $\lambda_3$, $\lambda_4$, $\lambda_5$/frequency different to the wavelength/frequency of the other light sources 202. Alternatively or in addition, the LIDAR system 200 may include one or more light source(s) configured to emit electromagnetic radiation of different/multiple wavelengths/frequencies. An optical filter, e.g. a low pass, high pass, band pass or notch filter may select a wavelength/frequency of a plurality of wavelengths $\lambda_1$, $\lambda_2$, $\lambda_3$, $\lambda_4$, $\lambda_5$/frequencies of a single light source. This way, by using wavelength multiplexing of spatially parallel optical channels in a PIC 100/waveguide structures of PIC 100, the detrimental effects due to fluctuating targets and TOF limitations are mitigated, thus enabling a coherent LIDAR with high optical resolution, high data rate, and long-range detection to be achieved.

Further illustrated in FIG. 2 is the branching of light paths from the at least one input 104 to the plurality of outputs Tx. The branching may be realized by a plurality of optical amplifiers 108, e.g. SOA, a plurality of optical splitters 110 and a plurality of waveguide structures 124 (solid lines in FIG. 2).

The light receiving input 104 may include an optical coupler configured to optically interconnect electromagnetic radiation 120 of an electromagnetic radiation source outside of the semiconductor photonic substrate (e.g. an external electromagnetic radiation source) to the at least one optical splitter.

A waveguide structure 124 may be in the form of a strip line or micro strip line. However, a waveguide structure 124 may also be configured as a planar waveguide. The waveguide structure 124 may be configured to guide electromagnetic radiation emitted from a light source couple to the input 104 to the output Tx. The waveguide structure 124 may be formed from the material of the semiconductor photonic substrate 102. Waveguide structures 124 may be optically isolated from each other. As an example, at least one waveguide structure 124 may be formed from semiconductor photonic substrate 102.

Figure 3:
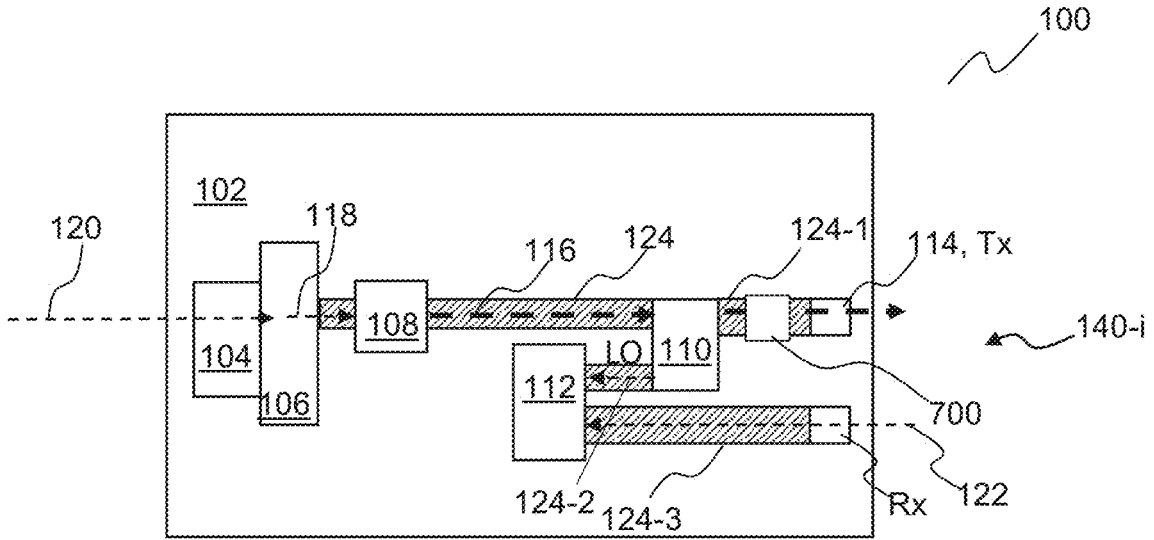
FIG. 3 illustrates a schematic diagram of a PIC.

Further illustrated in FIG. 2 and FIG. 3 is a use of balanced photo detector structure pairs as photo detector structures 112 in the light paths 140-$i$ respectively. The photo detector structure 112 may reduce an impact of electronic noise on the detected signal. Further illustrated in FIG. 2—and in more detail in FIG. 3—is a use of a part of the light from the beam splitter 110 as input signal for a photo detector structure 112 in the light paths respectively. Here, the input signal may be used as local oscillator (LO) for determining a difference between the light 114 emitted from the Tx port of the PIC 100 and light 122 received from the Rx port at the photo detector structure 122. Temporal fluctuations of the emitted light 114 may be considered in the received light 122 for each light path 140-$i$ individually, thus allowing the LIDAR system 200 to detect and discriminate the optical frequency of the received light.

The photo detector structure 112 of different light paths may be optically isolated from each other and/or may be addressable independently from each other. In other words, the photo detector structures 112 of different light paths may be configured to detect light from the outside of the PIC 100 independently from each other.

The photonic integrated circuit 100 may include a semiconductor photonic substrate 102. The semiconductor photonic substrate 102 may have integrated therein at least one light receiving input 104 and at least one optical splitter 106 to branch light received at the at least one light receiving input 104 to a first light path 140-1 and a second light path 140-2, e.g. of the plurality of light paths 140-N (see also FIG. 4).

The semiconductor photonic substrate 102 may be made of a semiconductor material, e.g. silicon. The semiconductor photonic substrate 102 may be common substrate, e.g. at least for the plurality of light paths. The term "integrated therein" may be understood as formed from the material of the substrate and, thus, may be different to the case in which elements are formed, arranged or positioned on top of a substrate. The term "located next" may be interpreted as formed in or on the same (a common) semiconductor photonic substrate 102.

The at least one optical splitter 106 may be configured to branch light received at the at least one light receiving input 104 to a plurality of light paths 140-N. In each light path of the plurality of light paths 140-N, the photonic integrated circuit 100 may include at least one amplifier structure 108 to amplify the light in the light path to provide an amplified light. Each light path of the plurality of light paths may include at least one light output Tx configured to output the amplified light from the photonic integrated circuit 100. Each light path of the plurality of light paths may include at least one photo detector structure 112 configured to receive light 122 from the outside of the photonic integrated circuit 100. The at least one photo detector structure 112 may be located next to the at least one light output Tx. The at least one photo detector structure 112 may be located next to the at least one light output Tx, e.g. integrated in the common semiconductor photonic substrate 102. The at least one light output Tx and the at least one photo detector structure 112 may be arranged on the same side of the photonic integrated circuit 100. The at least one photo detector structure 112 may include a photo diode and a beam combiner (also denoted as optical combiner, optical beam combiner or optical mixer). The beam combining structure is configured to merge at least two individual beams to a single beam. The beam combining structure may include the first input and the second input.

The first input may be coupled to an optical splitter structure and the second input may be coupled to an input of the PIC 100 to receive light from the outside of the PIC 100. Alternatively, the second input may be coupled to another light path of the PIC 100 to receive light from another light path of the PIC 100.

The output of the beam combining structure may effectively be optically split, e.g. into two individual beams, in case a balanced photodiode pair is used.

FIG. 3 illustrates a schematic top view of a part of a PIC 100. Illustratively, the PIC 100 includes a semiconductor photonic substrate 102 having integrated therein a plurality of light paths 140-$i$ (with i being anyone of 1 to N and N being an integer denoting the number of channels of the PIC). Each light path 140-$i$ includes at least one optical splitter structure, a photo detector structure 112, a first waveguide structure 124-1, a second waveguide structure 124-2 and a third waveguide structure 124-3.

Illustratively, a waveguide structure 124 transmits a light 116 having an arbitrary polarization, e.g. a linear polarization, to the optical splitter structure. The optical splitter structure is configured to split the light received at a receiving input partly into light of a first linear polarization and light of a second linear polarization. As an example, the optical splitter 110 transmits light of one of the lights of first linear polarization or of the second linear polarization towards the output Tx of the PIC 100 and the optical splitter 110 transmits the light having the other linear polarization towards the photo detector structure. As an example, the first polarization may be oriented parallel to the surface of the substrate 102 and the second polarization may be oriented perpendicular to the surface of the substrate 102. However, the opposite case of orientation or any other orientation may also be possible so long as the first linear polarization and the second linear polarization are perpendicular to each other. Further, the light 116 at the input of the optical splitter structure and the light outputted from the Tx port may have the same linear polarization, and, thus, the light towards the photo detector structure may have a linear polarization orthogonal to the polarization of the light at the input of the optical splitter structure and orthogonal to the polarization of the light the Tx port is outputting. Alternatively, the light 116 at the input of the optical splitter structure and the light transmitted to the photo detector structure may have the same linear polarization, and, thus, the light outputted from the Tx port may have a linear polarization orthogonal to the polarization of the light at the input of the optical splitter structure and orthogonal to the polarization of the light transmitted to and received by the photo detector structure. Alternatively, the orientation of a linear polarization of the light received from the optical splitter structure may be different to the orientation of the first linear polarization and the second linear polarization.

Illustratively, the optical splitter structure may be an optically functional system including one more optical components. The one optical component alone, or the two or more optical components together alter the light received at the receiving input of the optical splitter structure into a first light path section and a second light path section. Each of the first light path section and the second light path section supports linear polarized light. However, the linear polarized light of the first light path section is orthogonally polarized to the light of the second light path section.

As an example, the optical splitter structure may include an optical splitter 110 and a polarization rotator 700. The optical splitter 110 and the polarization rotator 700 may be configured as separate components. Alternatively, the optical splitter 110 and the polarization rotator 700 may be integrated or formed by a single optical component, e.g. based on total internal reflection, birefringence, a Faraday rotation or a combination thereof.

The optical splitter 110 may be configured to branch light 116 received from at least one light receiving input (in FIG. 3 the SOA 108 acts as input) to a first light path section and a second light path section. The light receiving input (108) may be configured to be coupled (at least indirectly) to at least one coherent electromagnetic radiation source 202.

The polarization rotator 700, e.g. optically arranged between the splitter 110 and the output Tx along the first light path section, is configured to turn the polarization or at least a portion of the light from a first linear polarization to a second linear polarization before the output Tx emits the light 114. The second linear polarization is orthogonal to the first polarization. The polarization rotator may be a Faraday rotator, a birefringent structure or a total internal reflection structure, as an example. The polarization rotator 700 may be arranged before, after, along or integrated in the first waveguide structure 124-1. Alternatively or in addition, the polarization rotator 700 may be arranged before, after, along or integrated in the second waveguide structure 124-2, and, thus, in the second light path section or at least partially in the second light path section. Alternatively or in addition, the polarization rotator 700 may be arranged before, after, along or integrated in the third waveguide structure 124-3, and, thus, in the third light path section or at least partially in the third light path section. In other words, the polarization rotator 700 may be arranged or integrated in or more light path sections of a light path. As an example, the polarization rotator 700 may be arranged or formed in the first light path section and the third light path section, e.g. arranged before, after, along or integrated in the first waveguide structure 124-1 and the third waveguide structure 124-3.

Illustratively, the photo detector structure may be an optically functional system including one more optical components. The one optical component alone, or the two or more optical components together are configured to receive light from the optical splitter structure, e.g. through the second waveguide structure 124-2, (also denoted as light of the second light path section) and from the outside of PIC 100, e.g. through the third waveguide structure 124-3, (also denoted as light of the third light path section) and merge (also dentoded as combine) these lights into a single merged light beam or, for example in case a balanced photodiode pair is used, into two or more merged beams with known phase relation. The light of the second light path section and the light of the third light path section are coherent and have matching modes and, thus, may interfere. The light of the third light path section may be correlated to the light of the second light path section. The merged light beam includes the desired information of the LIDAR system. The merged light beam may include desired information in the form of a time-dependent interference pattern.

As an example, the photo detector structure 112 may include a beam combining structure (not illustrated) having the first input and the second input of the photo detector structure 112 configured to merge the light of the second waveguide structure 124-2 received at the first input of the photo detector structure 112 and the light of the third waveguide structure 124-3 received at the second input of the photo detector structure 112 into a single merged beam. Light in the second waveguide structure 124-2 and light in the third waveguide structure 124-3 may be coherent and have matching modes and, thus, may interfere with each other in the beam combining structure. This way the photo diode of the photo detector structure 112 coupled to beam combining structure may determine a signal corresponding to the interference signal. The interference signal may include time-dependent intensity fluctuations corresponding to the structure of the scanned target 210 (see FIG. 1). Alternatively, another light path of the plurality of light paths may provide the light at the second input of the photo detector structure.

The first light path section may further include a first waveguide structure 124-1 and an output Tx of the PIC 100. The first waveguide structure 124-1 may be configured to guide light of the first linear polarization. The output Tx (also denoted as Tx) of the PIC 100 may be configured to emit light to the outside of the PIC 100.

The second light path section may further include a second waveguide structure 124-2 and a photo detector structure 112. The second waveguide structure 124-2 may be configured to guide light of the second linear polarization. As an example, the second waveguide structure 124-2 optically couples the optical splitter 110 of the optical splitter structure with a first input of the photo detector structure 112. This way light from the optical splitter 110 may act as a local oscillator (LO) signal for the photo detector structure 112.

The photo detector structure 112 further may include a second input configured to receive light having the second linear polarization, e.g. from the outside of the PIC 100.

Each light path 140-$i$ may further include a third light path section. The third light path section may further include an input of the PIC 100 and a third waveguide structure 124-3, wherein the input is configured to receive light from the outside of the PIC 100, and wherein the third waveguide structure 124-3 is configured to guide light of the second linear polarization. The third waveguide structure 124-3 optically couples the input of the third light path section with the second input of the photo detector structure 112. Alternatively, or in addition, the photo detector structure 112 may include a beam combining structure (not illustrated) having the first input and the second input of the photo detector structure 112 configured to merge the light of the second waveguide structure 124-2 received at the first input of the photo detector structure 112 and the light of the third waveguide structure 124-3 received at the second input of the photo detector structure 112 into a single beam. Light in second waveguide structure 124-2 and in the third waveguide structure 124-3 may be coherent and, thus, may interfere with each other in the beam combining structure. This way the photo diode of the photo detector structure 112 may determine a signal corresponding to the interference signal.

As an example, the first waveguide structure 124-1 may be configured to have a first aspect ratio perpendicular to direction of propagation of light in the first waveguide structure 124-1, e.g. the first waveguide structure 124-1 may have a larger width than height. The second waveguide structure 124-2 may be configured to have a second aspect ratio perpendicular to direction of propagation of light in the second waveguide structure 124-2. The second aspect ratio may be about inverted to the first aspect ratio, e.g. the second waveguide structure 124-2 may have a larger height than width.

FIG. 4 illustrates a schematic top view of a LIDAR system 200. The LIDAR system 200 includes the PIC 100 and at least one electromagnetic radiation source 202 coupled to the at least one light receiving input 104 and configured to emit a coherent electromagnetic radiation $\lambda_1$, $\lambda_2, \lambda_3, \lambda_4, \lambda_5$. A lens 204 may be optically arranged to guide light 114 from the output (TX) of the PIC 100 to the outside of the LIDAR system 200, as illustrated in FIG. 1. A polarization diversity optic 300 may be optically arranged between the PIC 100 and the lens 204. The polarization diversity optic 300 may be configured to turn the polarization along the light path from the first linear polarization to the second linear polarization, as illustrated in further detail in FIG. 5 to FIG. 8B.

As an example, the polarization diversity optic 300 may include a polarizing beam displacer 302 and a Faraday rotator 304. The polarizing beam displacer 302 may comprise a birefringent crystal arranged with its optic axis tilted with regard to the optical axis of the incoming light path. By doing this, the coupling efficiency may be increased and the aberrations may be reduced. As an example, the optic axis of the polarizing beam displacer 302 may be arranged at an angle below 10° with respect to the optical axis of the incoming light path instead of a default value of 45°. However, the specific tilt angle depends on the optical properties of further optical components along the light path. The tilt angle may be determined by a numerical method.

The polarization diversity optic 300 may further include a quarter or half wave plate 306. The polarization diversity optic 300 may further include a birefringent plate 308. The polarization diversity optic 300 may further include a displacement structure, e.g. a recess 308 or protrusion along the light path, configured to spatially displace the input for receiving light from the outside of the PIC 100 regarding the output emitting light to the outside of the PIC 100. This way, optical path length differences may be adjusted or considered.

The electromagnetic radiation source 202 is configured to be operated as a continuous wave laser and/or a pulsed laser.

Further, a grating structure 206 may be optically arranged to guide light from lens 204 to the outside of the LIDAR system 200. A scan mirror 404 may be arranged in the light path between the grating structure 206 and the outside of the LIDAR system 200. The scan mirror 404 may be configured to be movable to scan the environment of the LIDAR system 200. Alternatively, or in addition, the grating structure 206 may be configured to be a movable reflection grating.

Further, a quarter wave plate 402 or half wave plate may be arranged in the light path between the grating structure 206 and the scan mirror.

The LIDAR system 200 may further include a controller. The controller may be configured to control the electromagnetic radiation source 202 to emit a first electromagnetic radiation through a first light path of the PIC 100 to the outside of the LIDAR system 200 and a second electromagnetic radiation through a second light path of the PIC 100 to the outside of the LIDAR system 200; and to control a first photo detector structure 112 to detect a first received electromagnetic radiation received through the third light path section of the first light path of the PIC 100 from the outside of the LIDAR system 200, and to control a second photo detector structure 112 to detect a second electromagnetic radiation through the third light path section of the second light path of the PIC 100 from the outside of the LIDAR system 200.

As an example, the LIDAR system 200 may include a lens 204 arranged in the light path between the grating structure 206 and the photonic integrated circuit 100. The lens 204 may be configured to guide light of the plurality of light paths 140-N of the photonic integrated circuit 100 into different directions outside of the LIDAR system 200 by the grating structure 206. In other words, the lens 204 may be configured and/or may be provided such that light from the outputs Tx of the plurality of light paths 140-N have different angles of inclination on a (planar) grating structure 206. However, a single optical element may integrate the function of the lens 204 and of the grating structure 206. The grating structure 206 may be configured to guide or redirect electromagnetic radiation of a first wavelength by a first angle and a second wavelength by a second angle. Thus, light may be emitted in different directions in space depending on the wavelength (frequency) of the light. Light of different wavelengths may be emitted at the same time, e.g. the light paths may be multiplexed, or subsequently. As an example, light of a second wavelength $\lambda_2$ maybe emitted in the time period while awaiting light of a first wavelength $\lambda_1$ to be received at the photo detector structure 112. This, way a scanning, sensing or sampling of different parts of a target or free space at the same time may be enabled and, thus, the resolution of the LIDAR system 200 may be increased.

Figures 8A, 8B:
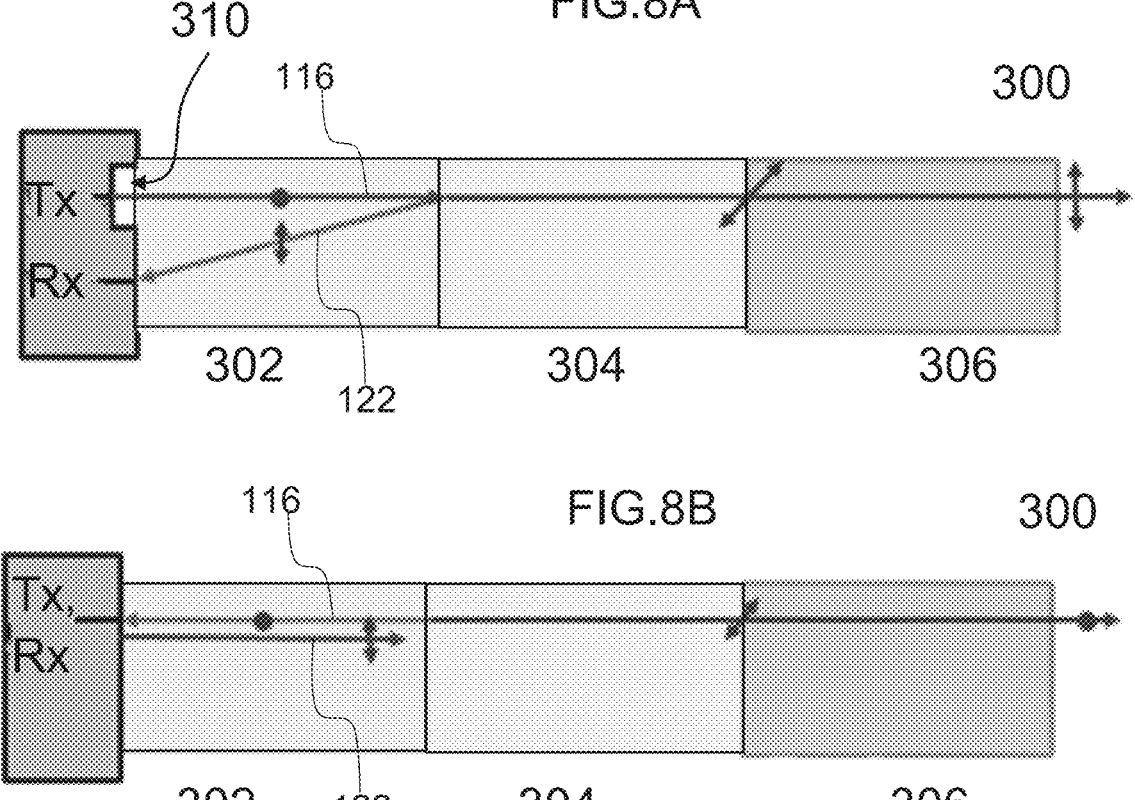

FIG. 5 to FIG. 8B illustrate polarization diversity optics 300 of a coherent bistatic LIDAR system 200, e.g. as illustrated in FIG. 1 to FIG. 4. Further, FIG. 5 to FIG. 8A illustrate schematic top views of polarization diversity optics 300 and FIG. 8B illustrates a side view of the polarization diversity optic 300 illustrated in FIG. 8A.

The Tx and Rx channels of the illustrated polarization diversity optics 300 may include a polarizing beam displacer (PBD) 302, a Faraday Rotator (FR) 304, a Half Wave Plate (HWP) 306, a Quarter Wave Plate (QWP), a birefringent plate 308 and/or a recess 310 to alter the focal plane. These optical components 302, 304, 306, 310 may be optically arranged between the output Tx and the lens 204 (see FIG. 2). Further illustrated is the polarization direction of electromagnetic radiation along the light path.

The PBD 302, the FR 304, the HWP 306 and/or the birefringent plate 308 may be configured or be optical components that are commercially available. However, the optical components may be optically arranged so that the coupling efficiency is maximized. As an example, the optic axis may be tilted regarding a center axis.

The Faraday Rotator (FR) 306 does not change the native linear polarization, e.g. not linear polarization to circular polarization. However, the FR 304 may introduce a 45 degree polarization retardation. The FR 304 may enable a single linear polarization throughout the optical path 140-1. Targets 210 tend to reflect a linear polarization and, thus, FR 304 may improve the signal received at the photo detector structure 112.

The FR 304 coupled with the HWP 306 may cause a full transition to orthogonal polarization (illustrated by the arrows at the right end of the optical paths 140-i). This way, the separation of Tx and Rx channels is enabled. In other words, the separation of Tx channels and Rx channels may be enabled by the FR 304. The FR 304 introduces a 45 degree rotation. The polarization rotation would also occur without a HWP 306. The HWP 306 allows control over the state of the polarization outputted to the lens 204 or Rx port. The polarization state shown by the arrows at the right end of 140-i may be advantageous for the design of the grating 206.

Further, this way, the number of PIC channels may be increased, and, thus, the number of vertical resolution elements may be increased. Alternatively, using fewer or smaller PICs but having a comparable vertical resolution as a PIC of the related art, and, this way, cost per PIC may be reduced.

The PBD 302 optic axis orientation and placing, e.g. the spatial location, of the TX/RX ports at different focal planes (recessing) by the recess 310 and/or the birefringent plate 308 may compensate for the aberrations and different optical paths for Rx channels and Tx channels introduced by the PBD 302.

The number of LIDAR channels can be increased by a factor of M for a given PIC 100 to achieve a desired high number (>100) of vertical resolution elements or pixels by using a multiple (M) wavelength laser source and a diffraction grating 206 (see FIG. 2 to FIG. 4) with a monostatic Tx/Rx PIC 100, as shown in FIG. 3. However, a monostatic Tx/Rx PIC of the related art may be subject to greater interference and lower isolation of the (shared) Tx and Rx light path sections of a light path 140-*i* and would thus have reduced LIDAR performance than a bistatic LIDAR illustrated in FIG. 5 to FIG. 8B wherein the Tx and Rx light paths are separated.

Bistatic coherent LIDAR systems as illustrated in FIG. 5 to FIG. 8B potentially show superior performance when linearly polarized light is used to interrogate a scene (e.g. illustrated in FIG. 1) rather than circularly polarized light. Linear polarization may be accomplished in various aspects by incorporating the FR 304 in the light path 140-*i* (also denoted as optical path or optical train) between the output Tx and the lens 302 (see FIG. 2 or FIG. 4).

If the FR 304 is used between the PIC 100 and the grating 206 (see FIG. 2 or FIG. 4), it may be sufficient that the grating 206 supports a single useable polarization. Thus, higher-performance gratings 206 can be designed for a single polarization.

This way, optical isolation of the Tx path and Rx path may be increased and interference of coherent light along the Tx path with coherent light along the Rx path may be reduced. At the same time, a high coupling efficiency may be maintained and, hence, a high-performance coherent LIDAR with high optical resolution, high data rate, and long-range detection capabilities may be achieved.

Illustratively, a bistatic single-PIC 100 as illustrated in FIG. 2 can be realized by splitting the Tx channel and Rx channel of a light path 140-*i* at least section-wise into separate optical paths (also denoted as optical circuits), and adding polarization diversity optics. As an example, linearly polarized light from a Tx channel of the PIC is transmitted through the PBD 302 and the FR 304 (e.g. the polarization diversity optics 300), a collimating lens 204, a diffraction grating 206 and beam steering optics, e.g. a scan mirror 404, and finally to the target 210 (see also FIG. 1 and FIG. 2).

Upon scattering from the target 210, the beam steering optics 404, the diffraction grating 206 and collimating lens 204 collect the return light 122 (also denoted as light 122 reflected from the target 210 or light along the Rx channel). The beam steering optics 404, the diffraction grating 206 and collimating lens 204 direct the light 122 back into the polarization diversity optics 300. The polarization diversity optics 300 rotates the polarization of the light and spatially displaces the return beam 122, and focuses the return beam 122 into an Rx channel of the PIC 100, e.g. onto the photo detector structure 112, e.g. through the third waveguide structure section 124-3.

In detail, FIG. 5 shows an example of the polarization diversity optics 300 that incorporates the PBD 302 and the FR 304. However, other configurations that apply different polarization transformations to light along the Tx path and Rx path, such as a Quarter Wave Plate (QWP) may also be suitable as polarization diversity optics. Optical path lengths through the polarization diversity optics 300 may be different for the polarization states of light along the Tx path and Rx path, and, hence, a focusing error can occur. A birefringent plate 308, as illustrated in FIG. 6 may compensate this optical path length difference. Alternatively, or in addition, a recess 310, as illustrated in FIG. 7 may compensate optical path length difference, or a protrusion (not illustrated). The recess 310 may be a spatial displacement between the Rx and Tx port along the light path 140-*i* regarding the first and second inputs of the photo detector structure 112.

In addition to the focusing error due to different focus locations for the two polarizations, the polarization diversity optics 300 may add significant path length in the path of the diverging/focusing beam and may introduce optical aberration for the Rx/Tx diverging/focusing beams. These aberrations may include spherical aberrations, astigmatism, coma, and others. With polarization diversity optics 300, light 114 along the Tx path would have a first aberration and light 122 along the Rx path would have a second aberration different from the first aberration. Illustratively, the polarization diversity optics 300 may be configured to minimize the difference between the first aberration and the second aberration (also denoted as aberration difference). This way, the coupling efficiency of the light at the first input and the second input of the beam combiner of the photodetector structure 122 from the Tx port of the PIC 100 to the target 210 and from the target 210 into the Rx port of the PIC 100 is optimized. As an example, optimizing the optic axis of the PBD 302 as mentioned above reduces these aberrations difference and improves the coupling efficiency.

FIG. 8A shows a top view and FIG. 8B shows a side view of FIG. 8A of another aspect in which intentional astigmatism, e.g. different focal point in different polarization axis, in the displaced beam are utilized to compensate for astigmatic aberration caused by the PBD 302. Alternatively, or in addition, the PBD 302 may rotate the crystal optic axis to an optimal angle to minimize the added optical aberrations and, this way, may optimize the coupling efficiency.

For one or more aspects, at least one of the components set forth in one or more of the preceding figures may be configured to perform one or more operations, techniques, processes, and/or methods as set forth in the example section below.

EXAMPLES

The examples set forth herein are illustrative and not exhaustive.

Example 1 may be a photonic integrated circuit that may include a semiconductor photonic substrate having integrated therein a plurality of light paths. Each light path may include an optical splitter structure configured to branch received coherent light to a first light path section and a second light path section. The optical splitter structure may be configured to turn the polarization of at least a portion of the received coherent light into light of a first linear polarization and light of a second linear polarization orthogonal to the first polarization. The first light path section may include a first waveguide structure configured to guide light of the first linear polarization from the optical splitter structure to an output of the photonic integrated circuit to the outside of the photonic integrated circuit. The second light path section may include a second waveguide structure and a photo detector structure, the second waveguide structure configured to guide light of the second linear polarization from the optical splitter structure into a first input of the photo detector structure, wherein the photo detector structure configured to receive light having the second linear polarization from outside the light path of the photonic integrated circuit via a second input of the photo detector structure, the photo detector structure further configured to determine an interference signal of light received at the first input with light received at the second input.

As an example, the photonic integrated circuit (PIC) may include a semiconductor photonic substrate having integrated therein a plurality of light paths, each light path may include an optical splitter structure. The optical splitter structure configured to branch light received from at least one light receiving input to a first light path section and a second light path section. The light receiving input may be configured to be coupled to at least one coherent electromagnetic radiation source. The optical splitter structure may be configured to turn the polarization of at least a portion of the light received at the receiving input into light of a first linear polarization and light of a second linear polarization that may be orthogonal to the first polarization. The first light path section may include a first waveguide structure and an output of the PIC. The first waveguide structure may be configured to guide light of the first linear polarization from the optical splitter structure to the output of the PIC, and wherein the output of the PIC may be configured to emit light of the first linear polarization to the outside of the PIC. The second light path section may include a second waveguide structure and a photo detector structure. The photo detector structure may include a first input and a second input respectively configured to receive light having the second linear polarization. The second waveguide structure may be configured to guide light of the second linear polarization and may be configured to optically couple the optical splitter structure with the first input of the photo detector structure. The photo detector structure may be configured to determine an interference signal of light received at the first input with light received at the second input of the photo detector structure. Illustratively, the photo-detector mixes light of the same polarization. A polarization rotator may be optically arranged in front of the photo detector structure to provide light at the first input and the second input of the beam combining structure so that the lights at the beam combining structure has the same polarization direction.

In Example 2, the subject matter of Example 1 can optionally include that the photo detector structure may include a beam combiner and a photo diode, the beam combiner configured to combine light received at the first input with light received at the second input and to provide the combined light to the photo diode. As an example, the photo detector structure may include a beam combiner and a photo diode. The beam combiner may include the first input, the second input and an output coupled to the first input and the second input. The output may be coupled to the photo diode.

In Example 3, the subject matter of Example 1 or 2 can optionally include that the optical splitter structure may include an optical splitter and a beam polarization rotator, the optical splitter coupling the receiving input, the first waveguide structure and the second waveguide structure; the polarization rotator optically coupled to or integrated in the first waveguide structure. As an example, the optical splitter structure may include an optical splitter and a beam polarization rotator. The optical splitter may be coupled to the receiving input, the first waveguide structure and the second waveguide structure. The polarization rotator may be optically coupled to or integrated in the first waveguide structure.

In Example 4, the subject matter of any one of Examples 1 to 3 can optionally include that each light path further may include a third light path section configured to guide light of the second linear polarization from the outside of the photonic integrated circuit to the second input. As an example, each light path may further include a third light path section. The third light path section may include an input of the PIC and a third waveguide structure. The input may be configured to receive light from the outside of the PIC, and wherein the third waveguide structure may be configured to guide light of the second linear polarization. The third waveguide structure optically couples the input of the third light path section with the second input of the photo detector structure.

In Example 5, the subject matter of any one of Examples 1 to 4 can optionally include that the first waveguide structure that may include a first aspect ratio. The second waveguide structure may include a second aspect ratio that may be approximately inverted to the first aspect ratio. As an example, the first waveguide structure may be configured to have a first aspect ratio perpendicular to direction of propagation of light in the first waveguide structure and wherein the second waveguide structure may be configured to have a second aspect ratio perpendicular to direction of propagation of light in the second waveguide structure. The second aspect ratio may be about inverted to the first aspect ratio. This way, the first waveguide and the second waveguide are configured to support different modes of the guided light. Illustratively, the first waveguide structure may have a cross-section perpendicular to the direction of propagation that has width larger than its height (first aspect ratio) with the propagation direction being perpendicular to the cross-section. The second waveguide structure may have a cross-section perpendicular to the direction of propagation that has height larger than its width (second aspect ratio) with the propagation direction being perpendicular to the cross-section. However, the first aspect ratio and the second ratio may depend on the specific polarizations of the light to be guided by the first waveguide structure and the second waveguide structure.

In Example 6, the subject matter of any one of Examples 1 to 5 can optionally include that the semiconductor photonic substrate may be made of a semiconductor material.

Example 7 is a LIDAR system that may include a PIC that may include of any one of example 1 to 6. Each light path may further include a third light path section configured to guide light of the second linear polarization from the outside of the photonic integrated circuit to the second input. The light detection and ranging system further may include at least one coherent electromagnetic radiation source coupled to the light receiving input; a lens to guide light from the output of the photonic integrated circuit to the outside of the light detection and ranging system; and a polarization diversity optic between the photonic integrated circuit and the lens, the polarization diversity optic configured to turn the polarization of light from the first linear polarization to the second linear polarization. As an example, the PIC may include a third light path section. The third light path section may include an input of the PIC and a third waveguide structure. The input may be configured to receive light from the outside of the PIC, and wherein the third waveguide structure may be configured to guide light of the second linear polarization. The third waveguide structure optically couples the input of the third light path section with the second input of the photo detector structure. The LIDAR system may further include: at least one electromagnetic radiation source coupled to the at least one light receiving input of the PIC and configured to emit a coherent electromagnetic radiation; a lens optically arranged to guide light from the output of the PIC to the outside of the LIDAR system; and a polarization diversity optic optically arranged between the PIC and the lens. The polarization diversity optic may be configured to turn the polarization of light from the first linear polarization to the second linear polarization.

In Example 8, the subject matter of Example 7 can optionally include that the polarization diversity optic may be configured to turn the first linear polarization of the light emitted from the output of the first light path section of the PIC to the second linear polarization received from the input of the third light path section of the PIC.

In Example 9, the subject matter of any one of Examples 7 or 8 can optionally include that the polarization diversity optic may include a polarizing beam displacer.

In Example 10, the subject matter of any one of Examples 7 to 9 can optionally include that the optic axis of the polarizing beam displacer may be tilted regarding an optical center of the light path.

In Example 11, the subject matter of any one of Examples 7 to 10 can optionally include that the polarization diversity optic may include a Faraday rotator, and a quarter wave plate or a half wave plate.

In Example 12, the subject matter of any one of Examples 7 to 11 can optionally include that the polarization diversity optic may include a birefringent plate.

In Example 13, the subject matter of any one of Examples 7 to 12 can optionally include that the polarization diversity optic may include a displacement structure configured to spatially displace the input of the third light path section regarding the output of the first light path section.

In Example 14, the subject matter of any one of Examples 7 to 13 can optionally include that the electromagnetic radiation source may be configured to be operated as a continuous wave laser and/or a pulsed laser.

In Example 15, the subject matter of any one of Examples 7 to 15 can optionally include that the LIDAR system may further include a grating structure configured to guide light from lens to the outside of the light detection and ranging system, wherein the grating structure may be a diffraction grating or a reflection grating. As an example, the grating structure may be optically arranged to guide light from lens to the outside of the LIDAR system. The grating structure may be a diffraction grating or a reflection grating.

In Example 16, the subject matter of Example 15 can optionally include that the grating structure may be configured to be a movable reflection grating.

In Example 17, the subject matter of any one of Examples 7 to 16 can optionally include that the LIDAR system may further include a scan mirror arranged to guide light from lens to the outside of the LIDAR system.

In Example 18, the subject matter of any one of Example 17 can optionally include that the scan mirror may be configured to be movable.

In Example 19, the subject matter of any one of Examples 7 to 18 can optionally include that the LIDAR system may further include a quarter wave plate in the light path between the grating structure and the scan mirror.

In Example 20, the subject matter of any one of Examples 7 to 19 can optionally include that the LIDAR system may further include a controller configured to control the electromagnetic radiation source to: emit a first electromagnetic radiation through a first light path of the PIC to the outside of the LIDAR system and a second electromagnetic radiation through a second light path of the PIC to the outside of the LIDAR system; and to control a first photo detector structure to detect a first received electromagnetic radiation received through the third light path section of the first light path of the PIC from the outside of the LIDAR system, and to control a second photo detector structure to detect a second electromagnetic radiation through the third light path section of the second light path of the PIC from the outside of the LIDAR system.

Example 21 is a vehicle that includes a LIDAR system that can include the subject matter of any one of Example 7 to 20.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects. Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A photonic integrated circuit, comprising
a semiconductor photonic substrate having integrated therein a plurality of light paths, each light path comprising:
an optical splitter structure configured to branch received coherent light to a first light path section and a second light path section,
wherein the optical splitter structure comprises a polarization diversity optic configured to transmit the received coherent light along the second light path section,
wherein the photonic integrated circuit comprises a recess configured to compensate an optical path length difference between the first light path section and the second light path section,
wherein the recess forms a spatial displacement in the photonic integrated circuit between a receive and a transmit port in the photonic integrated circuit,
wherein the optical splitter structure is configured to turn the polarization of at least a portion of the received coherent light into light of a first linear polarization and light of a second linear polarization orthogonal to the first polarization;
wherein the first light path section comprises a first waveguide structure configured to guide light of the first linear polarization from the optical splitter structure to an output of the photonic integrated circuit to outside of the photonic integrated circuit; and
wherein the second light path section comprises a second waveguide structure and a photo detector structure, the second waveguide structure configured to guide light of the second linear polarization from the optical splitter structure into a first input of the photo detector structure, wherein the photo detector structure configured to receive light having the second linear polarization from outside the light path of the photonic integrated circuit via a second input of the photo detector structure, the photo detector structure further configured to determine an interference signal of light received at the first input with light received at the second input.

2. The photonic integrated circuit according to claim 1, wherein the photo detector structure comprises a beam combiner and a photo diode, the beam combiner configured to combine light received at the first input with light received at the second input and to provide the combined light to the photo diode.

3. The photonic integrated circuit according to claim 1, wherein the optical splitter structure comprises an optical splitter and a beam polarization rotator, the optical splitter coupling the receiving input, the first waveguide structure and the second waveguide structure; the polarization rotator optically coupled to or integrated in the first waveguide structure.

4. The photonic integrated circuit according to claim 1, each light path further comprising a third light path section configured to guide light of the second linear polarization from outside of the photonic integrated circuit to the second input.

5. The photonic integrated circuit according to claim 1,
the first waveguide structure comprising a first aspect ratio;
the second waveguide structure comprising a second aspect ratio that is approximately inverted to the first aspect ratio.

6. The photonic integrated circuit according to claim 1, wherein the semiconductor photonic substrate is made of a semiconductor material.

7. A light detection and ranging system, comprising:
a photonic integrated circuit comprising a semiconductor photonic substrate having integrated therein a plurality of light paths, each light path comprising:
an optical splitter structure configured to branch received coherent light to a first light path section and a second light path section, and
wherein the optical splitter structure is configured to turn a polarization of at least a portion of the received coherent light into light of a first linear polarization and light of a second linear polarization orthogonal to the first polarization;
wherein the first light path section comprises a first waveguide structure configured to guide light of the first linear polarization from the optical splitter structure to an output of the photonic integrated circuit to outside of the photonic integrated circuit;
wherein the second light path section comprises a second waveguide structure and a photo detector structure, the second waveguide structure configured to guide light of the second linear polarization from the optical splitter structure into a first input of the photo detector structure, wherein the photo detector structure configured to receive light having the second linear polarization from outside the light path of the photonic integrated circuit via a second input of the photo detector structure, the photo detector structure further configured to determine an interference signal of light received at the first input with light received at the second input;
each light path further comprising a third light path section configured to guide light of the second linear polarization from outside of the photonic integrated circuit to the second input;
the light detection and ranging system further comprising:
at least one coherent electromagnetic radiation source coupled to the light receiving input;
a lens to guide light from the output of the photonic integrated circuit to outside of the light detection and ranging system; and
a polarization diversity optic between the photonic integrated circuit and the lens, the polarization diversity optic configured to turn the polarization of light from the first linear polarization to the second linear polarization,
wherein the optical splitter structure comprises a polarization diversity optic configured to transmit the received coherent light along the second light path section,
wherein the photonic integrated circuit comprises a recess configured to compensate an optical path length difference between the first light path section and the second light path section, and
wherein the recess forms a spatial displacement in the photonic integrated circuit between a receive and a transmit port in the photonic integrated circuit.

8. The light detection and ranging system according to claim 7, the polarization diversity optic configured to turn the first linear polarization of the light emitted from the output of the first light path section of the photonic integrated circuit to the second linear polarization received from the input of the third light path section of the photonic integrated circuit.

9. The light detection and ranging system according to claim 7, wherein the polarization diversity optic comprises a polarizing beam displacer.

10. The light detection and ranging system according to claim 9, wherein an optic axis of the polarizing beam displacer is tilted regarding an optical center of the light path.

11. The light detection and ranging system according to claim 7, wherein the polarization diversity optic comprises a Faraday rotator and a half wave plate, or a quarter wave plate.

12. The light detection and ranging system according to claim 7, wherein the polarization diversity optic comprises a birefringent plate.

13. The light detection and ranging system according to claim 7, wherein the polarization diversity optic comprises a displacement structure configured to spatially displace an input of the third light path section regarding the output of the first light path section.

14. The light detection and ranging system according to claim 7,
the first waveguide structure comprising a first aspect ratio;
the second waveguide structure comprising a second aspect ratio that is approximately inverted to the first aspect ratio.

15. The light detection and ranging system according to claim 7, the electromagnetic radiation source as a continuous wave laser and/or a pulsed laser.

16. The light detection and ranging system according to claim 7, further comprising: a grating structure configured to guide light from lens to outside of the light detection and ranging system, wherein the grating structure is a diffraction grating or a reflection grating.

17. The light detection and ranging system of claim 16, wherein the grating structure is configured to be a movable reflection grating.

18. The light detection and ranging system according to claim 17, further comprising: a scan mirror arranged to guide light from lens to outside of the light detection and ranging system.

19. The light detection and ranging system according to claim 18, wherein the scan mirror is configured to be movable.

20. The light detection and ranging system according to claim 18, further comprising: a quarter wave plate in the light path between the grating structure and the scan mirror.

21. The light detection and ranging system according to claim 7, further comprising a controller configured to control the electromagnetic radiation source to:

emit a first electromagnetic radiation through a first light path of the photonic integrated circuit to outside of the light detection and ranging system and a second electromagnetic radiation through a second light path of the photonic integrated circuit to outside of the light detection and ranging system; and to control a first photo detector structure to detect a first received electromagnetic radiation received through the third light path section of the first light path of the photonic integrated circuit from outside of the light detection and ranging system, and to control a second photo detector structure to detect a second electromagnetic radiation through the third light path section of the second light path of the photonic integrated circuit from outside of the light detection and ranging system.

22. A vehicle comprising a light detection and ranging system, the light detection and ranging system comprising:

a semiconductor photonic substrate having integrated therein a plurality of light paths, each light path comprising:

an optical splitter structure configured to branch received coherent light to a first light path section and a second light path section, and wherein the optical splitter structure is configured to turn a polarization of at least a portion of the received coherent light into light of a first linear polarization and light of a second linear polarization orthogonal to the first polarization;

wherein the first light path section comprises a first waveguide structure configured to guide light of the first linear polarization from the optical splitter structure to an output of a photonic integrated circuit to outside of the photonic integrated circuit;

wherein the second light path section comprises a second waveguide structure and a photo detector structure, the second waveguide structure configured to guide light of the second linear polarization from the optical splitter structure into a first input of the photo detector structure, wherein the photo detector structure configured to receive light having the second linear polarization from outside the light path of the photonic integrated circuit via a second input of the photo detector structure, the photo detector structure further configured to determine an interference signal of light received at the first input with light received at the second input, each light path further comprising a third light path section configured to guide light of the second linear polarization from outside of the photonic integrated circuit to the second input;

the light detection and ranging system further comprising:

at least one coherent electromagnetic radiation source coupled to the light receiving input;

a lens to guide light from the output of the photonic integrated circuit to outside of the light detection and ranging system; and a polarization diversity optic between the photonic integrated circuit and the lens, the polarization diversity optic configured to turn the polarization of light from the first linear polarization to the second linear polarization, wherein the optical splitter structure comprises a polarization diversity optic configured to transmit the received coherent light along the second light path section, wherein the photonic integrated circuit comprises a recess configured to compensate an optical path length difference between the first light path section and the second light path section, and wherein the recess forms a spatial displacement in the photonic integrated circuit between a receive and a transmit port in the photonic integrated circuit.

23. The vehicle according to claim 22, wherein the light detection and ranging system is configured for obstacle detection outside of the vehicle.

* * * * *